Sept. 11, 1962  H. B. BABSON  3,053,225
MILK HANDLING SYSTEM
Filed Sept. 8, 1959  2 Sheets-Sheet 1

Inventor
Henry B. Babson
Hofgren, Brady, Wegner, Allen & Stellman
Attorneys

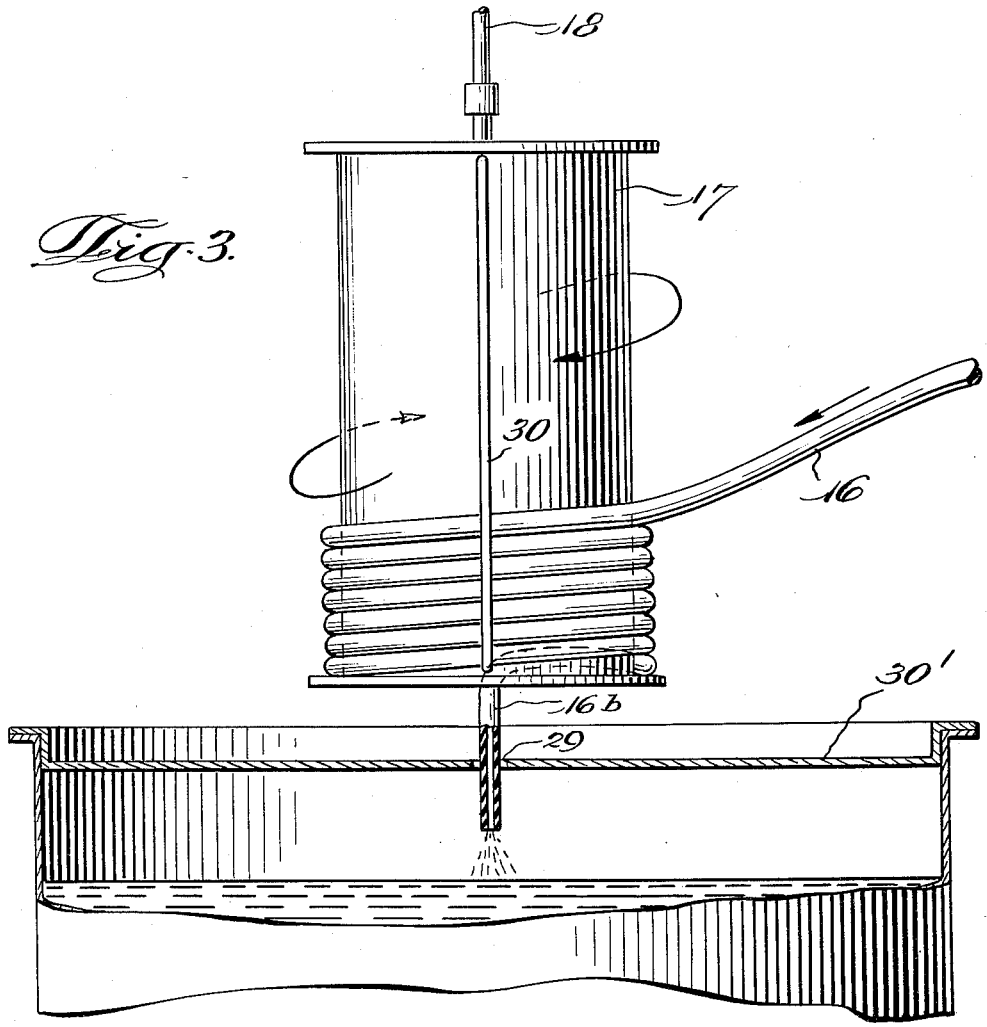
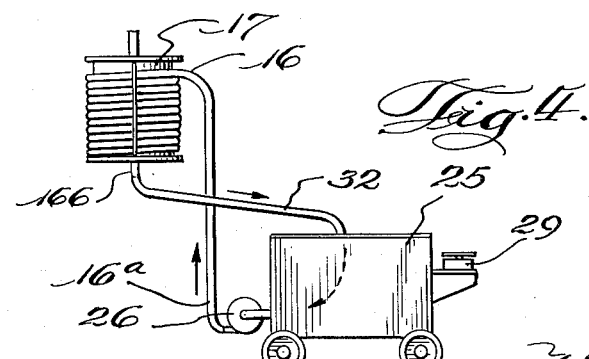

United States Patent Office

3,053,225
Patented Sept. 11, 1962

3,053,225
MILK HANDLING SYSTEM
Henry B. Babson, Chicago, Ill., assignor to Babson Bros.
Co., a corporation of Illinois
Filed Sept. 8, 1959, Ser. No. 838,674
3 Claims. (Cl. 119—14.18)

This invention relates to a carry-away milk handling system and more particularly to a carry-away system for a stanchion barn, bucket milking operation.

Two basically different carry-away milking systems are presently used by dairy farmers. In a parlor milking installation a plurality of milking stations each with milking equipment are provided in the milking area or parlor and the cows walk to these stations for milking. A relatively short, fixed pipeline carries the milk from each milking station to a milk receiving device or holding tank. Many dairy farmers who have a substantial investment in a stanchion barn prefer to continue to use it rather than to construct a milking parlor. The carry-away milking systems installed in stanchion barns are relatively expensive as the pipeline extends along the top of the stalls and may be quite long. In stanchion barn milking the cows are placed in the stalls and the milking equipment taken from animal to animal. Valves are necessary along the pipeline for connection of the milking equipment. Both parlor and stanchion barn systems require special milking equipment; and bucket milkers must be discarded.

The principal purpose of this invention is the provision of a milk handling system which permits the use of bucket milkers in stanchion barns yet retains many of the advantages of a carry-away milk handling system.

One feature of the invention is the provision of a milk handling system for transferring milk from a milking area to a milk receiving means, comprising a flexible hose, storage means for the hose adjacent the milk receiving means, the hose being extendable from the storage means through the milking area, a receptacle for milk connected with the end of the hose and movable through the area and means associated with the hose for causing milk to flow from the receptacle through the hose to the tank. Another feature is that the hose is stored on a rotatable reel mounted over the top of the tank and a connector from one end of the hose extends along the axis of the reel through an opening in the tank cover.

A further feature is the provision of spaced supports for the flexible hose throughout the milking area, which supports preferably take the form of hooks that are at different heights pitching the hose to facilitate the flow of milk to the holding tank and which are separated by a distance less than the height of the hooks above the floor so that the free end of the hose may be pulled back as the hose is returned to storage, and will fall free from each of the hooks without dragging on the floor.

Still another feature of the invention is a method of milking including removing a flexible hose from storage adjacent the milk receiving means, extending the hose through the milking area and causing milk to flow from the milking area through the hose to receiving means.

Further features and advantages of the invention will readily be apparent from the following specification and from the drawings, in which:

FIGURE 3 is an enlarged elevation of the hose storage reel; and

FIGURE 4 is a reduced elevation illustrating the connection of the system for cleaned in place washing.

Carry-away milking systems have become quite popular with dairy farmers and have the principal advantages of being more sanitary than former milking procedures in which milk was merely poured into a storage container, and requiring less work as the filled milker buckets are not carried from the point of milking to the storage container. However, carry-away installations are relatively expensive, particularly in a stanchion barn operation where the pipeline must cover a substantial area. The present invention is concerned with a carry-away system which achieves most of the advantages of a pipeline system at a much reduced cost.

Figure 1:
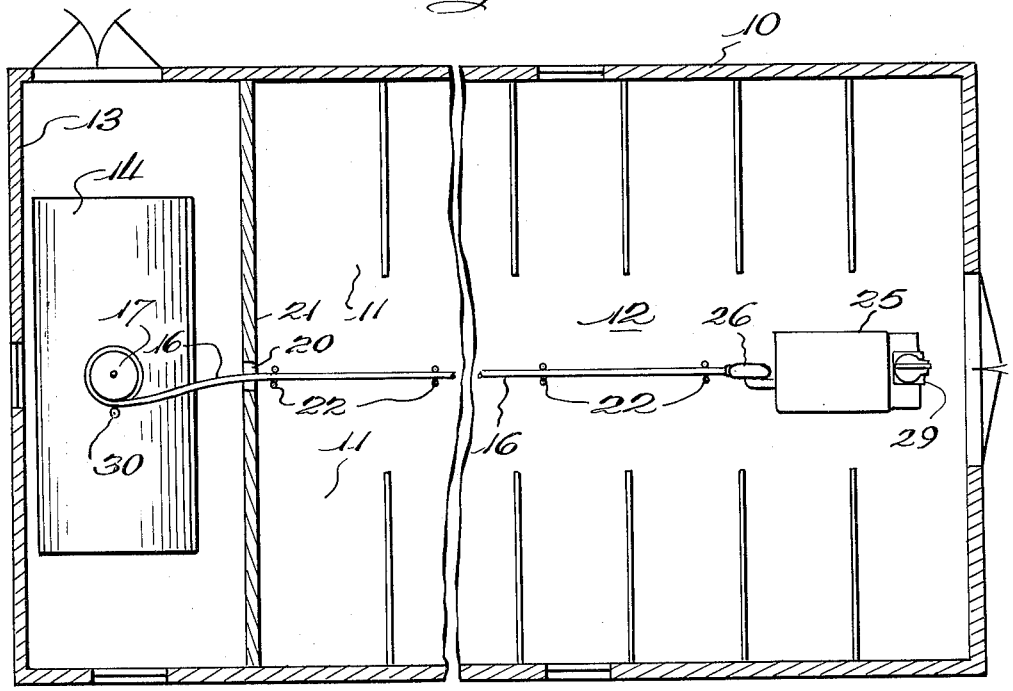
FIGURE 1 is a plan view of a barn and milk house with a milk handling system embodying the invention.
Figure 2:
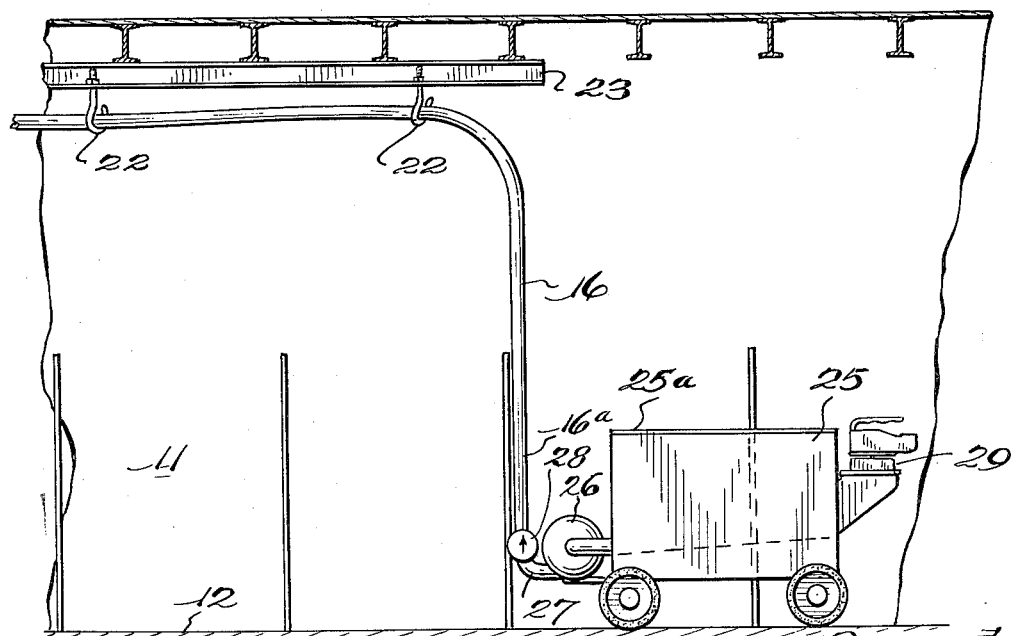
FIGURE 2 is an enlarged fragmentary elevation of the movable milk receptacle, a portion of the flexible hose and the hose supports.

Turning now to the drawings and particularly to FIGURES 1 and 2, a barn 10 is illustrated having a milking area provided with a series of stanchion stalls 11 extending along either wall and separated by an aisle 12. A milk room 13 is provided at one end of barn 10, and may be a separate structure, in which a milk receiving or holding tank 14 is located. Tank 14 is preferably at atmospheric pressure and may be refrigerated if desired. Preferably the tank has a capacity adequate to hold the milk from several milkings and the milk is picked up by a tank truck at regular intervals. The particular form of barn 10 and layout of stalls 11 is intended to be exemplary only of a typical installation and many other arrangements may be used.

During milking the stalls 11 each contain a cow and the operator, who may handle three milker units, moves the units from animal to animal. In the system being described, the milk is collected in buckets, which may be of the type illustrated in McCornack Patent 1,859,213, and each of which has a capacity slightly greater than the yield of one animal, as forty or fifty pounds of milk.

Referring now also to FIGURE 3, a flexible hose 16 is stored on a reel or drum 17 mounted from an overhead support 18 for rotation about a vertical axis The hose may be extended from the storage reel through an opening 20 in the wall 21 separating barn 10 from milk house 13 and is supported in the barn by a series of hooks 22 carried by beam 23. An intermediate milk receptacle is provided in the form of a portable tank 25 mounted on wheels for movement through the milking area. The outlet of tank 25 is connected with the inlet of pump 26 which has an outlet 27. The end 16a of hose 16 is connected through check valve 28 with pump outlet 27. The other end 16b of hose 16 extends downwardly from the hose reel 17 along the axis of rotation of the hose reel and through an opening 29 in the cover 30 of holding tank 14. As hose end 16b is on the axis of rotation of reel 17, the opening 29 may be of the same order of size as the diameter of the hose.

The following milking procedure is utilized. The farmer connects the free end 16a of flexible hose 16 with the outlet 27 of pump 26 and positions the portable tank 25 adjacent dividing wall 21 between the milking area and the storage tank. The hose 16 may be supported by one or more of the hooks 22 closest to the receiving tank. The cows closest to the tank are milked first and the milk poured from the buckets into portable tank 25, which is preferably provided with a removable cover 25a to prevent contamination of the milk in the tank. Periodically pump 26 is operated causing the milk to flow through hose 16 into the storage tank. The supporting hooks 22 for hose 16 are adjusted in height so that the hose supported from them is pitched toward holding tank 14.

A scale 29 is mounted on tank 25 permitting the measurement of the weight of milk delivered by each cow for the purpose of providing complete production records.

As the cows are successively milked, milk receiving tank 25 is moved along aisle 12 through the milking area to points successively further and further away from milk holding tank 14. As required, hose 16 is supported from hooks 22. After milking has been completed, the end 16a of hose 16 is disconnected from pump outlet 27 and the hose returned to the storage reel, by merely rotating the reel, either manually or through a suitable power drive (not shown). The spacing between successive hooks 22 is less than the height of the hooks above the floor of aisle 12 so that as the hose is drawn back into the milk room and the end 16a falls free from successive hooks, it will not hang down and drag on the floor. A vertical bar 30 is positioned alongside reel 17 and spaced from it slightly more than the diameter of hose 16 and less than twice the hose diameter. This bar guides the hose onto the reel while it is being wound up causing the hose to wind thereon in a spiral configuration, which insures that milk will flow downwardly through the stored hose by gravity and will not be trapped in a low point or pocket of the hose.

Turning now to FIGURE 4, the system is shown connected for washing. The system is particularly adapted for "in place" washing by circulating washing solution as it has no joints or valves along the length of the flexible hose. Hose 16 is coiled on reel 17 and the end 16b is removed from the holding tank. A short length of hose 32 is connected between hose end 16b and tank 25 while hose end 16a is again connected with pump 26. Washing solution is placed in tank 25 and pump 26 operated forcing the solution through the entire hose and back to the tank. During the washing operation the end of connector hose 32 may be moved about washing down the walls and the bottom of the tank 25. Following washing, the hose is disconnected from the pump and the end portion coiled on reel 17 allowing the washing solution in the hose to drain.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A milk handling system comprising: a stanchion barn, including a milking room having an aisle and a plurality of stalls adjacent said aisle and a milk storage area; a milk storage tank located in said storage area; a support member spaced above said tank and extending along said aisle; a plurality of holding members spaced on said support; an intermediate movable milk collecting tank; a reel adjacent said storage tank; a hose wound on said reel having one end connected to said storage tank, said hose extendible the length of said aisle and supportable by said holding member; and a pump mounted on said intermediate tank and connectable to said hose for pumping milk from said collecting tank through said hose to said storage tank.

2. A milk handling system comprising: a stanchion barn, including a milking room having a longitudinal aisle, a plurality of stalls adjacent said aisle and a milk storage room; a milk storage tank located in said milk storage room; a support member spaced above said tank and extending along said aisle; a plurality of holding members spaced on said supports; an intermediate movable milk collecting tank; a reel mounted over said milk storage tank; a hose wound on said reel having one end connected to said tank, said hose extendible the length of said aisle and supportable by said holding members, said holding members having predetermined lengths to support said hose in a downward sloping direction toward said storage tank and spaced apart less than the distance the support member is above the floor; and a pump mounted on said intermediate tank and connectible to said tank for pumping milk from said collecting tank through said hose in said storage tank.

3. A milk handling system comprising: a stanchion barn, including a milking room having a longitudinal aisle and a plurality of stalls spaced along said aisle; a milk storage room separated from said milking room by a wall; an aperture in said wall; a milk storage tank located in said storage room; a support member spacially positioned higher than said storage tank and extending along said aisle; a plurality of hooks spaced on said support member; an intermediate movable milk collecting tank; a reel mounted over said milk storage tank; a hose wound on said reel having one end connected to said storage tank, said hose extendible through said aperture and along the length of said aisle and supportable by said hooks, a pump, including a check valve mounted on said intermediate connecting tank and connectable to said hose for pumping milk from said connecting tank through said hose to said storage room.

References Cited in the file of this patent

UNITED STATES PATENTS

| | | |
|---|---|---|
| 361,474 | Weygant | Apr. 19, 1887 |
| 867,094 | Beman | Sept. 24, 1907 |
| 1,242,930 | Fields | Oct. 16, 1917 |
| 1,685,927 | Miller | Oct. 2, 1928 |
| 1,746,995 | Edwards | Feb. 11, 1930 |
| 2,090,734 | Piquerez | Aug. 24, 1937 |
| 2,354,693 | Martin | Aug. 1, 1944 |
| 2,572,518 | Redin et al. | Oct. 23, 1951 |
| 2,669,483 | Fletcher | Feb. 16, 1954 |
| 2,720,217 | Vossbrinck | Oct. 11, 1955 |
| 2,818,891 | Loeser | Jan. 7, 1958 |
| 2,895,450 | Hope | July 21, 1959 |
| 2,982,247 | Varese et al. | May 2, 1961 |

FOREIGN PATENTS

| | | |
|---|---|---|
| 17,830 | Great Britain | Aug. 6, 1907 |
| 81,381 | Sweden | Sept. 4, 1934 |

OTHER REFERENCES

Farm Implement and Machinery Review, June 1, 1950, pages 243, 244, and 245.

Farm Journal, May, 1958, page 37.